US008144658B2

(12) United States Patent
Damnjanovic et al.

(10) Patent No.: US 8,144,658 B2
(45) Date of Patent: *Mar. 27, 2012

(54) METHOD AND APPARATUS FOR MITIGATING INTERFERENCE IN A WIRELESS COMMUNICATION SYSTEM

(75) Inventors: Jelena Damnjanovic, Del Mar, CA (US); Durga Prasad Malladi, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1766 days.

This patent is subject to a terminal disclaimer.

(21) Appl. No.: 11/350,519

(22) Filed: Feb. 8, 2006

(65) Prior Publication Data

US 2006/0212133 A1   Sep. 21, 2006

Related U.S. Application Data

(60) Provisional application No. 60/652,518, filed on Feb. 11, 2005.

(51) Int. Cl.
*H04W 4/00* (2009.01)
(52) U.S. Cl. ......... 370/330; 370/329; 455/403; 455/450
(58) Field of Classification Search .................. 370/330, 370/329; 455/403, 450
See application file for complete search history.

(56) References Cited

U.S. PATENT DOCUMENTS

| 5,615,215 | A | * | 3/1997 | Utting et al. .................. 370/337 |
| 5,663,958 | A | * | 9/1997 | Ward ........................... 370/347 |
| 5,901,355 | A | * | 5/1999 | Doner ........................... 455/447 |
| 5,930,716 | A | | 7/1999 | Sonetaka |
| 5,953,661 | A | | 9/1999 | Schwinghammer et al. . 455/423 |
| 5,987,013 | A | * | 11/1999 | Kabasawa ..................... 370/331 |
| 6,839,542 | B2 | * | 1/2005 | Sibecas et al. ............... 455/41.2 |
| 6,907,246 | B2 | * | 6/2005 | Xu et al. ........................ 455/447 |
| 7,242,362 | B2 | * | 7/2007 | Hulkkonen et al. .......... 343/853 |
| 2003/0040306 | A1 | * | 2/2003 | Kentaro et al. ............... 455/422 |

(Continued)

FOREIGN PATENT DOCUMENTS

EP   0917383   5/1999

(Continued)

OTHER PUBLICATIONS

European Search Report—EP08010181, Search Authority—The Hague Patent Office, May 18, 2009.

(Continued)

*Primary Examiner* — Nghi Ly
(74) *Attorney, Agent, or Firm* — Nicholas J. Pauley; Peter M. Kamarchik; Jonathan T. Velasco

(57) ABSTRACT

Techniques to mitigate inter-cell interference using joint time and frequency division are described. A frequency band is divided into multiple non-overlapping frequency subbands. The transmission timeline is divided into $T_{in}$ and $T_{out}$ time intervals. Data is exchanged with users in at least one inner region of a cell on the entire frequency band in the $T_{in}$ time intervals. Data is exchanged with users in multiple outer regions of the cell on the multiple frequency subbands in the $T_{out}$ time intervals. The frequency band may be partitioned into three frequency subbands. Data may then be exchanged with users in first, second and third outer regions on first, second and third frequency subbands, respectively. The regions in which the users are located may be determined based on pilot and/or other measurements.

31 Claims, 10 Drawing Sheets

U.S. PATENT DOCUMENTS

2004/0097238 A1    5/2004    Hwang et al.
2010/0222061 A1*    9/2010    Damnjanovic et al. ....... 455/447

FOREIGN PATENT DOCUMENTS

| | | |
|---|---|---|
| JP | 08228375 | 9/1996 |
| JP | 11215055 | 8/1999 |
| JP | 2000511034 | 8/2000 |
| JP | 2002159048 | 5/2002 |
| WO | 9841049 | 9/1998 |

OTHER PUBLICATIONS

Flash OFDM specification "CS 1.1: Physical/Medium Access/Logical Link Control Protocol Specification", pp. 1-325, Jan. 1, 2004.

International Search Report and Written Opinion—PCT/US2006/005189, International Search Authority—European Patent Office—Jul. 13, 2006.

* cited by examiner

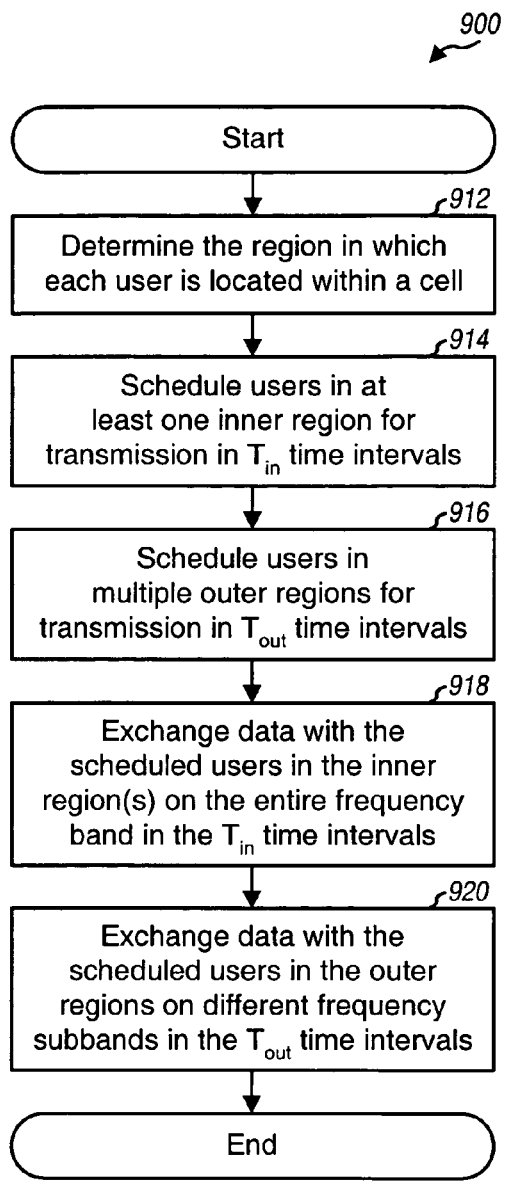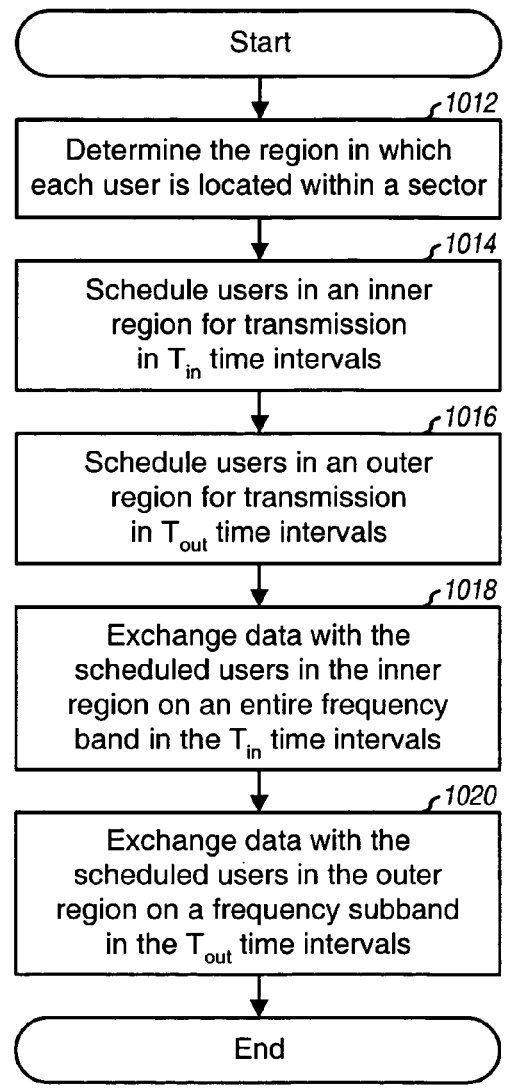
FIG. 9
FIG. 10

METHOD AND APPARATUS FOR MITIGATING INTERFERENCE IN A WIRELESS COMMUNICATION SYSTEM

CLAIM OF PRIORITY UNDER 35 U.S.C. §119

The present Application for Patent claims priority to Provisional Application Ser. No. 60/652,518, entitled "FREQUENCY PLANNING SCHEME FOR AN OFDM SYSTEM," filed Feb. 11, 2005, assigned to the assignee hereof, and expressly incorporated herein by reference.

BACKGROUND

I. Field

The present disclosure relates generally to communication, and more specifically to techniques for mitigating interference in a wireless communication system.

II. Background

A wireless multiple-access communication system can concurrently support communication for multiple terminals on the downlink and uplink. The downlink (or forward link) refers to the communication link from the base stations to the terminals, and the uplink (or reverse link) refers to the communication link from the terminals to the base stations. Multiple terminals may simultaneously transmit data on the uplink and/or receive data on the downlink. This may be achieved by multiplexing the data transmissions on each link to be orthogonal to one another in time, frequency, and/or code domain. The orthogonality ensures that the data transmission for each terminal minimally interferes with the data transmissions for other terminals.

A multiple-access system typically has many cells, where the term "cell" can refer to a base station and/or its coverage area depending on the context in which the term is used. Data transmissions for terminals in the same cell may be sent using orthogonal multiplexing to avoid "intra-cell" interference. However, data transmissions for terminals in different cells may not be orthogonalized, in which case each terminal would observe "inter-cell" interference from other cells. The inter-cell interference may significantly degrade performance for terminals observing high levels of interference.

To combat inter-cell interference, a system may employ a frequency reuse scheme in which each cell uses only a portion of a frequency band available for the system. For example, the system may employ a 7-cell reuse pattern and a frequency use factor of 1/7. In this system, the frequency band is divided into seven frequency subbands, and each cell in a 7-cell cluster is assigned one of the seven frequency subbands. Each cell uses only one frequency subband, and every seventh cell reuses the same frequency subband. With this frequency reuse scheme, the same frequency subband is only reused in cells that are not adjacent to each other, and the inter-cell interference observed in each cell is reduced relative to the case in which all cells use the entire frequency band. However, a small frequency use factor (e.g., 1/7) represents inefficient use of the available system resources since each cell is able to use only a fraction of the frequency band.

There is therefore a need in the art for techniques to reduce inter-cell interference in a more efficient manner.

SUMMARY

Techniques that can mitigate inter-cell interference in an efficient manner are described herein. According to an embodiment of the invention, an apparatus is described which includes at least one processor and a memory. The processor(s) exchange data with (e.g., send data to and/or receive data from) users in at least one inner region of a cell in a first time interval on a frequency band. The processor(s) exchange data with users in multiple outer regions of the cell in a second time interval on multiple frequency subbands formed with the frequency band. For example, the frequency band may be partitioned into three non-overlapping frequency subbands. The processor(s) may then exchange data with users in first, second and third outer regions on first, second and third frequency subbands, respectively, in the second time interval. Adjacent outer regions in neighboring cells may use different frequency subbands in the second time interval to mitigate inter-cell interference. The regions in which the users are located may be determined based on pilot and/or other measurements.

According to another embodiment, a method is provided in which data is exchanged with users in at least one inner region of a cell in a first time interval on a frequency band. Data is exchanged with users in multiple outer regions of the cell in a second time interval on multiple frequency subbands formed with the frequency band.

According to yet another embodiment, an apparatus is described which includes means for exchanging data with users in at least one inner region of a cell in a first time interval on a frequency band. The apparatus further includes means for exchanging data with users in multiple outer regions of the cell in a second time interval on multiple frequency subbands formed with the frequency band.

According to yet another embodiment, an apparatus is described which includes at least one processor and a memory. The processor(s) exchange data with users in a first region of a sector in a first time interval on a frequency band. The processor(s) exchange data with users in a second region of the sector in a second time interval on a frequency subband, which is a portion of the frequency band. Adjacent sectors in neighboring cells may use different frequency subbands in the second time interval to mitigate inter-cell interference.

According to yet another embodiment, a method is provided in which data is exchanged with users in a first region of a sector in a first time interval on a frequency band. Data is exchanged with users in a second region of the sector in a second time interval on a frequency subband.

According to yet another embodiment, an apparatus is described which includes means for exchanging data with users in a first region of a sector in a first time interval on a frequency band. The apparatus further includes means for exchanging data with users in a second region of the sector in a second time interval on a frequency subband.

According to yet another embodiment, an apparatus is described which includes at least one processor and a memory. The processor(s) exchange data with a first set of users in a first time interval based on a first frequency reuse scheme. The processor(s) exchange data with a second set of users in a second time interval based on a second frequency reuse scheme.

According to yet another embodiment, a method is provided in which data is exchanged with a first set of users in a first time interval based on a first frequency reuse scheme. Data is exchanged with a second set of users in a second time interval based on a second frequency reuse scheme.

According to yet another embodiment, an apparatus is described which includes means for exchanging data with a first set of users in a first time interval based on a first frequency reuse scheme. The apparatus further includes means for exchanging data with a second set of users in a second time interval based on a second frequency reuse scheme.

According to yet another embodiment, a terminal is described which includes at least one processor and a memory. The processor(s) exchange data with a base station on a frequency band in a first time interval if the terminal is located in an inner region of a sector or a cell. The processor(s) exchange data with the base station on a frequency subband in a second time interval if the terminal is located in an outer region of the sector or cell. The frequency subband is one of multiple frequency subbands formed with the frequency band.

According to yet another embodiment, a method is provided in which data is exchanged with a base station on a frequency band in a first time interval if a terminal is located in an inner region of a sector or a cell. Data is exchanged with the base station on a frequency subband in a second time interval if the terminal is located in an outer region of the sector or cell.

According to yet another embodiment, an apparatus is described which includes means for exchanging data with a base station on a frequency band in a first time interval if a terminal is located in an inner region. The apparatus further includes means for exchanging data with the base station on a frequency subband in a second time interval if the terminal is located in an outer region of the sector or cell.

Various aspects and embodiments of the invention are described in further detail below.

BRIEF DESCRIPTION OF THE DRAWINGS

FIG. 9 shows a process to transmit data in a cell.

FIG. 10 shows a process to transmit data in a sector.

DETAILED DESCRIPTION

The word "exemplary" is used herein to mean "serving as an example, instance, or illustration." Any embodiment described herein as "exemplary" is not necessarily to be construed as preferred or advantageous over other embodiments.

Figure 1:
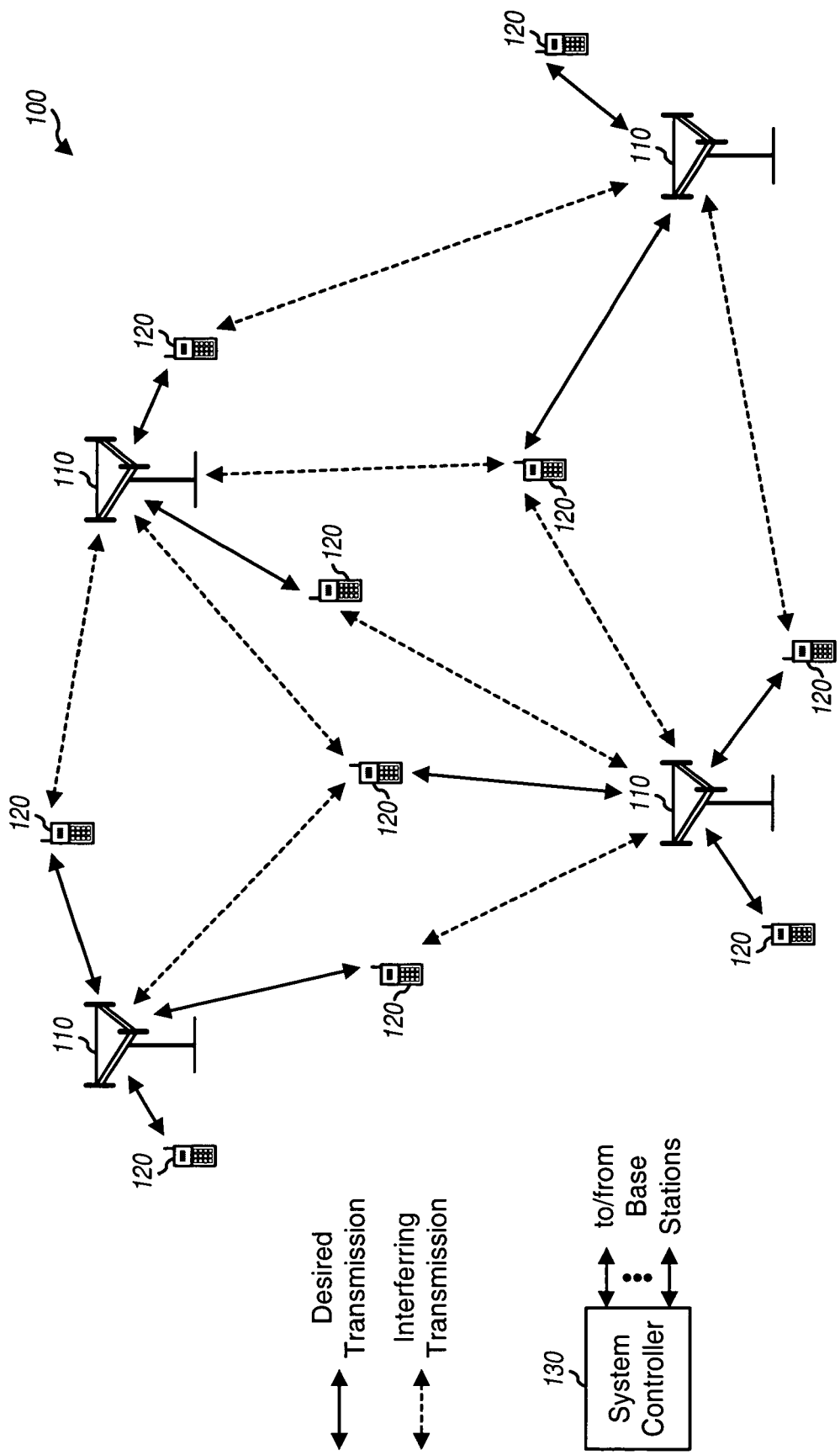
FIG. 1 shows a wireless multiple-access communication system.

FIG. 1 shows a wireless multiple-access communication system 100. System 100 includes a number of base stations 110 that support communication for a number of terminals 120. A base station is generally a fixed station that communicates with the terminals and may also be referred to as a Node B, an access point, or some other terminology. Terminals 120 are typically dispersed throughout the system, and each terminal may be fixed or mobile. A terminal may also be referred to as a user equipment (UE), a mobile station, a wireless communication device, or some other terminology. A terminal may communicate with one or possibly multiple base stations on the downlink and/or uplink at any given moment. The terms "terminal" and "user" are used interchangeably in the description below.

For a centralized architecture, a system controller 130 couples to the base stations and provides coordination and control for these base stations. System controller 130 may also be referred to as a radio network controller (RNC), a base station controller (BSC), a mobile switching center (MSC), or some other terminology. For a distributed architecture, the base stations may communicate with one another as needed, e.g., to serve the terminals, to coordinate usage of system resources, and so on.

To increase capacity, the coverage area of a base station may be partitioned into multiple sectors. Each sector may be defined by a different antenna beam pattern. For example, the base station coverage area may be partitioned into three sectors with three beam patterns that point 120° from each other. Each sector may be served by a base transceiver subsystem (BTS). For a sectorized cell, the base station for that cell typically includes the BTSs for all sectors of that cell. In general, the term "sector" can refer to a BTS and/or its coverage area, depending on the context in which the term is used. For simplicity, in the following description, the term "base station" is used generically for both a fixed station that serves a cell as well as a fixed station that serves a sector.

For simplicity, FIG. 1 shows each terminal communicating with one serving base station on the downlink and uplink. Each terminal may observe inter-cell interference from other base stations on the downlink and may cause inter-cell interference to other terminals on the uplink.

The transmission techniques described herein may be used for various communication systems such as a Code Division Multiple Access (CDMA) system, a Time Division Multiple Access (TDMA) system, a Frequency Division Multiple Access (FDMA) system, an Orthogonal Frequency Division Multiple Access (OFDMA) system, a Single-Carrier FDMA (SC-FDMA) system, and so on. A CDMA system may implement one or more radio access technologies (RATs) such as Wideband-CDMA (W-CDMA), cdma2000, and so on. cdma2000 covers IS-2000, IS-856, and IS-95 standards. A TDMA system may implement a RAT such as Global System for Mobile Communications (GSM). These various RATs and standards are known in the art. An OFDMA system transmits modulation symbols in the frequency domain on orthogonal frequency bins using orthogonal frequency division multiplexing (OFDM). An SC-FDMA system transmits modulation symbols in the time domain on orthogonal frequency bins. A system may also utilize a combination of radio technologies such as, e.g., W-CDMA and OFDM.

For clarity, the transmission techniques are described below for a system with multiple frequency bins, which may be obtained with OFDM, SC-FDMA, or some other modulation technique. OFDM and SC-FDMA partition the system bandwidth or frequency band into multiple (K) orthogonal frequency bins, which are also referred to as tones, sub-carriers, bins, and so on. Each frequency bin is associated with a respective sub-carrier that may be modulated with data.

In an aspect, joint time and frequency division is used to mitigate inter-cell interference. In an embodiment, the available frequency band is partitioned into multiple non-overlapping frequency subbands. The transmission timeline is also partitioned into time intervals. Some of the time intervals are designated as $T_{in}$ time intervals, and some other time intervals are designated as $T_{out}$ time intervals. The multiple frequency subbands may be used in different time intervals to mitigate inter-cell interference, as described below.

The transmission techniques described herein may be used for a system with sectorized cells as well as a system with unsectorized cells. A sectorized cell is a cell that is divided into multiple sectors. An unsectorized cell is a cell that is not divided into sectors.

Figure 2:
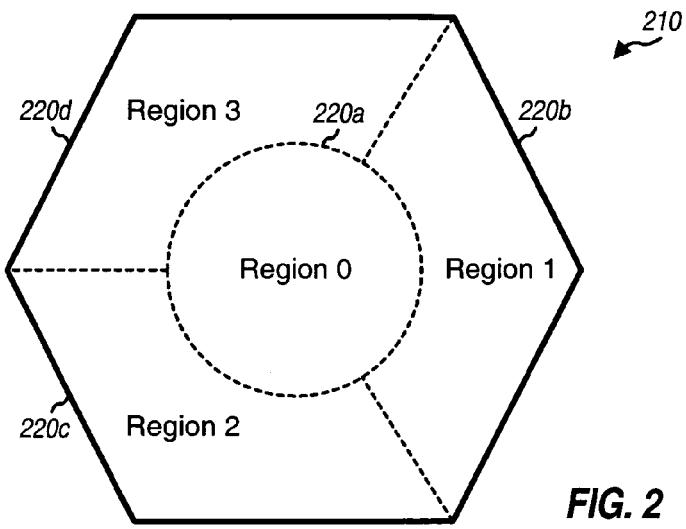
FIG. 2 shows a model for an unsectorized cell.

FIG. 2 shows a model for an unsectorized cell 210. In this model, the coverage area of a base station is modeled by an ideal hexagon. In general, a base station coverage area may be of any size and shape and is typically dependent on various factors such as terrain, obstructions, and so on. The base station coverage area may or may not be a contiguous area, and the cell edge may be quite complex.

The base station coverage area may be partitioned into multiple regions. A region may also be called a section, an area, a portion, and so on. In the embodiment shown in FIG. 2, the base station coverage area is partitioned into four regions 220a, 220b, 220c and 220d that are labeled as regions 0, 1, 2 and 3, respectively. Region 0 is an inner region and includes the center area of the cell. Region 0 is modeled with a circle in FIG. 2. The users within region 0 are referred to as inner users or inner circle users. Regions 1, 2 and 3 are outer regions and include the outer area of the cell. Each outer region is modeled by one third of the ideal hexagon, albeit without the center area that belongs to inner region 0. The users within regions 1, 2 and 3 are referred to as outer users or outer circle users.

In an embodiment, the available frequency band is partitioned into three frequency subbands that are denoted as $f_1$, $f_2$ and $f_3$. Frequency subband $f_1$ includes $K_1$ frequency bins, frequency subband $f_2$ includes $K_2$ frequency bins, and frequency subband $f_3$ includes $K_3$ frequency bins, where $K=K_1+K_2+K_3$ and K is the total number of frequency bins in the frequency band. The frequency band may be partitioned in various manners, as described below. The three frequency subbands may include the same or different numbers of frequency bins.

Figure 3:
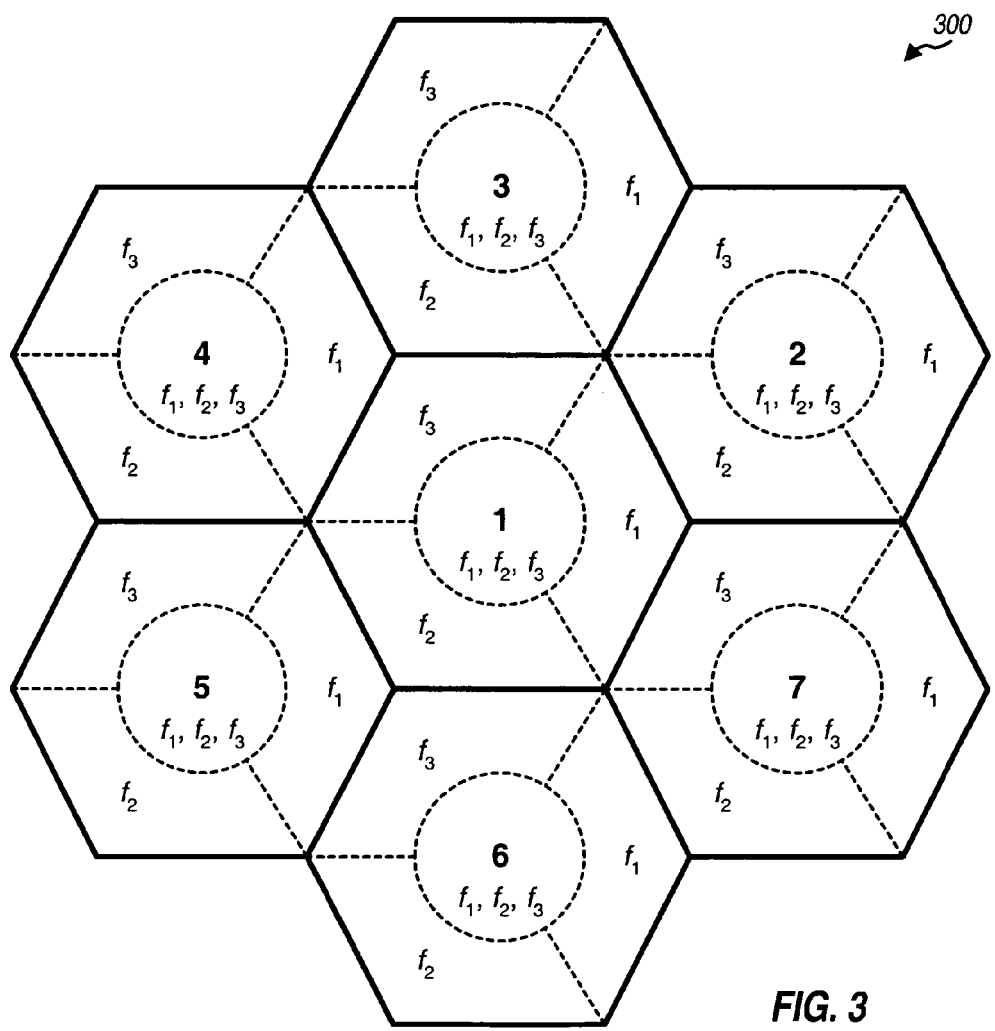
FIG. 3 shows an exemplary cell layout for a cluster of seven unsectorized cells.

FIG. 3 shows an exemplary cell layout 300 for a cluster of seven unsectorized cells that are labeled as cells 1 through 7. Each cell is partitioned into an inner region 0 and three outer regions 1, 2 and 3, as shown in FIG. 2. In an embodiment, the inner region 0 for each cell is assigned all three frequency subbands $f_1$, $f_2$ and $f_3$. The three outer regions 1, 2 and 3 for each cell are assigned frequency subbands $f_1$, $f_2$ and $f_3$, respectively. Hence, outer region i, for $i \in \{1,2,3\}$, is assigned frequency subband $f_i$. The users in each region may be allocated frequency bins in the frequency subband(s) assigned to that region.

In the embodiment shown in FIG. 3, each outer region of a given cell is adjacent to two outer regions that are assigned different frequency subbands in two neighboring cells. For example, outer region 1 of cell 1 is adjacent to outer region 2 of cell 2 and outer region 3 of cell 7. Outer region 2 of cell 1 is adjacent to outer region 1 of cell 5 and outer region 3 of cell 6. Outer region 3 of cell 1 is adjacent to outer region 2 of cell 3 and outer region 1 of cell 4. Each outer region of each cell is thus orthogonal in frequency to two adjacent outer regions in two neighboring cells.

Figure 4A:
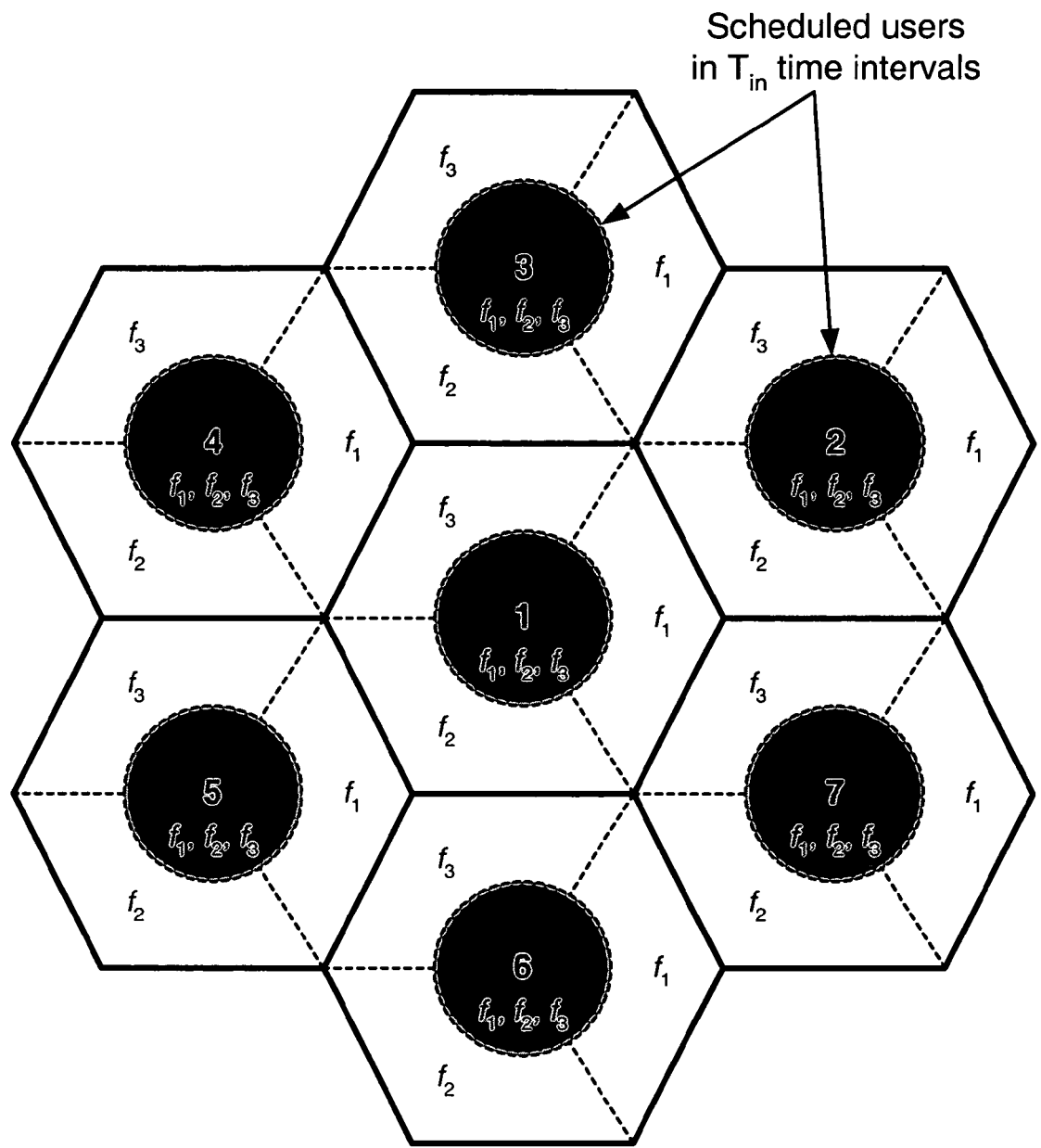
FIGS. 4A and 4B show scheduling of users in inner and outer regions, respectively.

FIG. 4A illustrates an embodiment of scheduling the inner users. In this embodiment, the inner users in all cells are scheduled during the $T_{in}$ time intervals. All three frequency subbands $f_1$, $f_2$ and $f_3$ may be used for the scheduled inner users in each cell. The inner regions for all cells are shown with gray shading. As shown in FIG. 4A, the inner region for each cell is located some distance away from the inner regions in the neighboring cells. Hence, even if the inner users in these cells are assigned the same frequency bins, the inner users in each cell may observe small amounts of inter-cell interference from the inner users in neighboring cells and may cause small amounts of interference to the inner users in the neighboring cells.

Figure 4B:
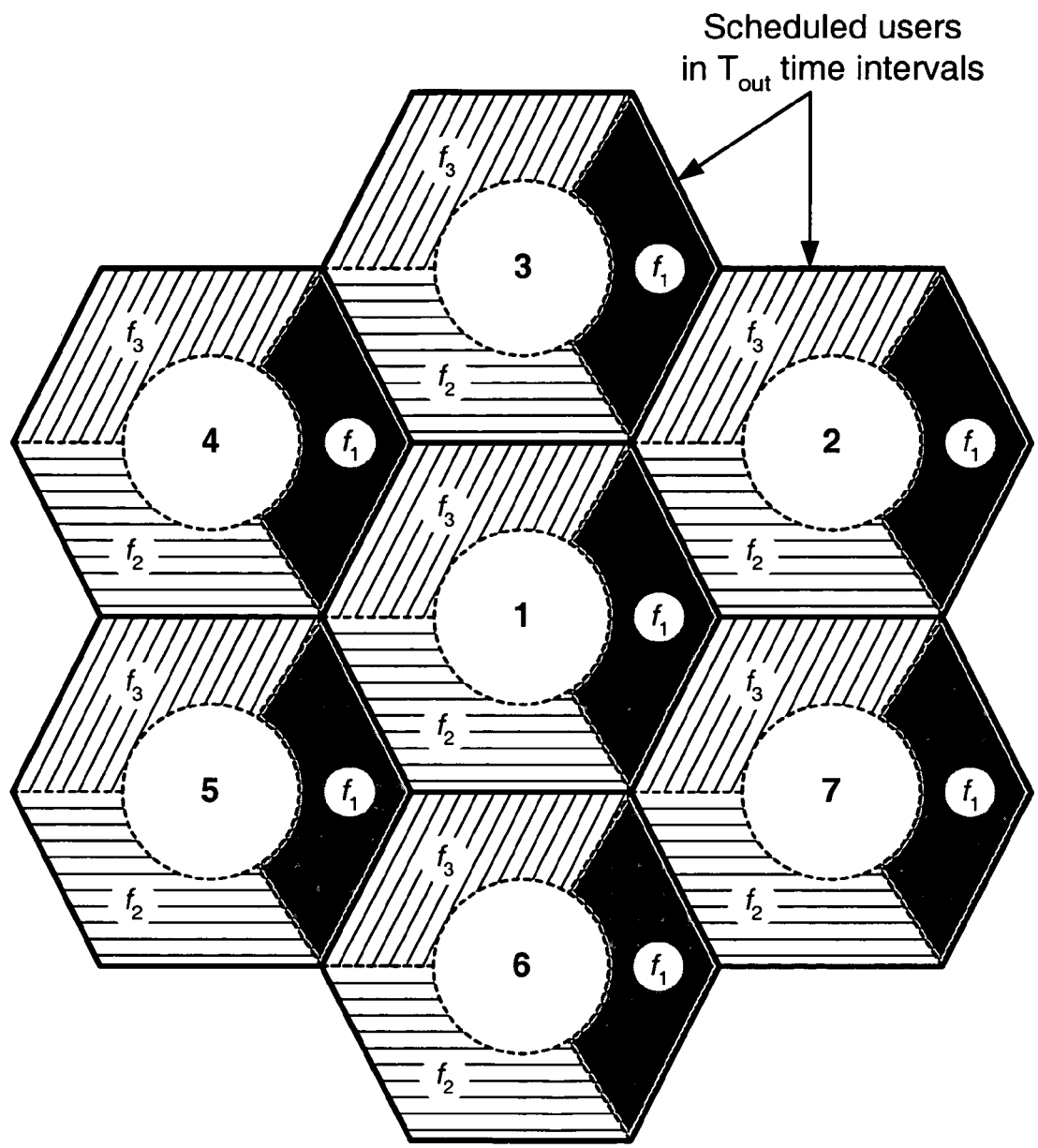

FIG. 4B illustrates an embodiment of scheduling the outer users. In this embodiment, the outer users in all cells are scheduled during the $T_{out}$ time intervals. Only the assigned frequency subband, which is a fraction of the frequency band, is used for the scheduled users in each outer region of each cell. In FIG. 4B, outer regions 1 for all cells are shown with gray shading, outer regions 2 for all cells are shown with horizontal hashing, and outer regions 3 for all cells are shown with diagonal hashing. As shown in FIG. 4B, adjacent outer regions in neighboring cells are assigned different frequency subbands. Hence, the outer users in each outer region of each cell do not observe inter-cell interference from the outer users in adjacent outer regions of neighboring cells. The outer regions assigned the same frequency subband $f_i$ are generally separated from one another by one outer region. The users in a given outer region i thus observe small amounts of inter-cell interference from the users in outer region i of neighboring cells and cause small amounts of inter-cell interference to the users in outer region i of the neighboring cells.

In another embodiment, some or all cells may exchange data with the inner users in the $T_{out}$ time intervals on the entire frequency band, in the same manner as in the $T_{in}$ time intervals, albeit with reduced transmit power. This embodiment provides some flexibility, e.g., if there are no or very few outer users in a given cell. The use of reduced transmit power ensures low interference, if any, to other transmissions in neighbor cells.

Figure 5:
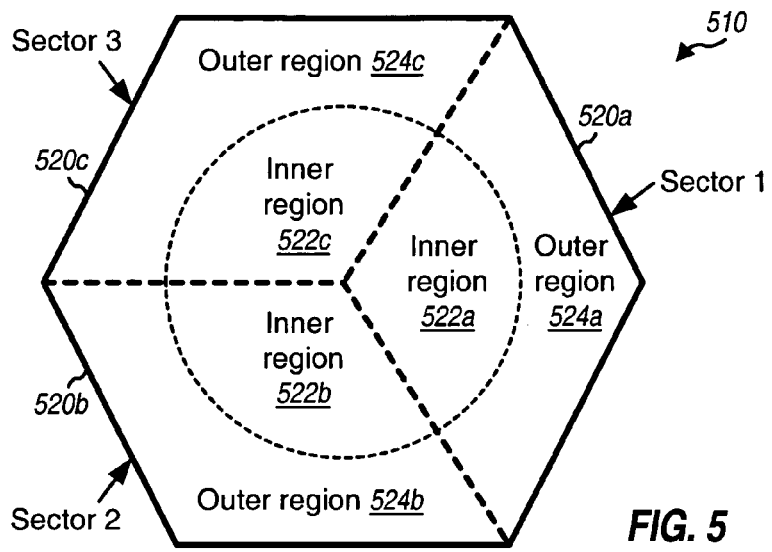
FIG. 5 shows a model for a sectorized cell.

FIG. 5 shows a model for a sectorized cell 510. In the embodiment shown in FIG. 5, the base station coverage area is partitioned into three sectors 520a, 520b and 520c that are labeled as sectors 1, 2 and 3, respectively. For the model shown in FIG. 5, the base station coverage area is modeled by an ideal hexagon, and each sector is modeled by one third of the ideal hexagon. In an embodiment, each sector is partitioned into an inner region 522 and an outer region 524. In this embodiment, the cell includes three inner regions and three outer regions for the three sectors of the cell.

Figure 6:
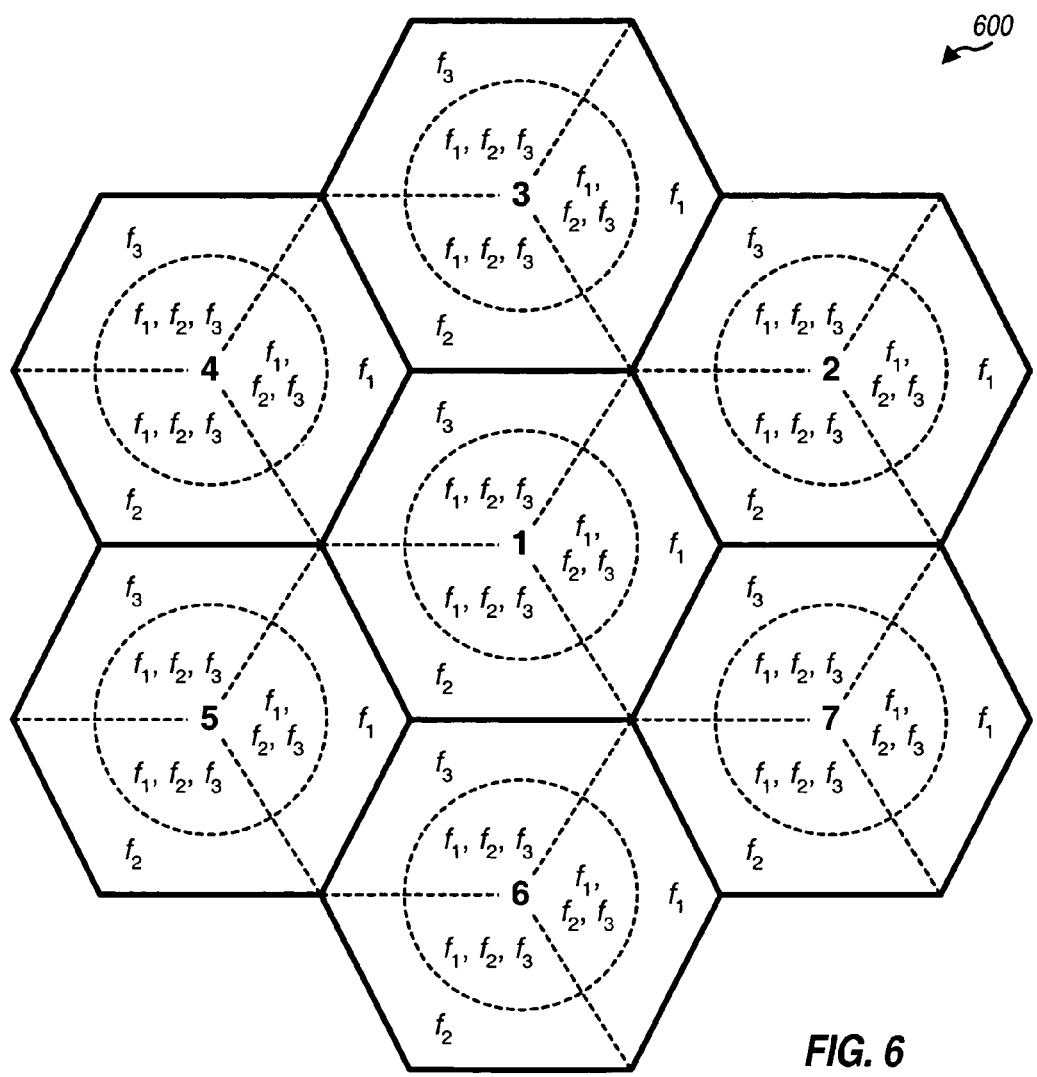
FIG. 6 shows an exemplary cell layout for a cluster of seven sectorized cells.

FIG. 6 shows an exemplary cell layout 600 for a cluster of seven sectorized cells that are labeled as cells 1 through 7. Each cell is partitioned into three sectors 1, 2 and 3, and each sector is partitioned into an inner region and an outer region, as shown in FIG. 5. In an embodiment, the three sectors 1, 2 and 3 for each cell are associated with frequency subbands $f_1$, $f_2$ and $f_3$, respectively. Each sector of a given cell is adjacent to two sectors that are associated with different frequency subbands in two neighboring cells. For example, sector 1 of cell 1 is adjacent to sector 2 of cell 2 and sector 3 of cell 7. Sector 2 of cell 1 is adjacent to sector 1 of cell 5 and sector 3 of cell 6. Sector 3 of cell 1 is adjacent to sector 2 of cell 3 and sector 1 of cell 4.

In an embodiment, each sector may communicate with the inner users on all frequency subbands during the $T_{in}$ time intervals. Each sector may communicate with the outer users on the associated frequency subband during the $T_{out}$ time intervals. As shown in FIG. 6, adjacent sectors in neighboring cells are associated with different frequency subbands. Hence, the outer users in each sector of each cell do not observe inter-cell interference from the outer users in the adjacent sectors in the neighboring cells.

The total transmit power $P_{max}$ available for transmission on a given link may be divided across the frequency subband(s) used for transmission. During the $T_{in}$ time intervals, all K frequency bins may be used for the scheduled inner users in each cell for the embodiment shown in FIG. 3 or in each sector for the embodiment shown in FIG. 5. The transmit power $P_k$ for each frequency bin k may be set as:

$$P_k = \frac{P_{max}}{K}. \quad \text{Eq (1)}$$

During the $T_{out}$ time intervals, $K_i$ frequency bins in frequency subband $f_i$ may be used for the scheduled users in outer region i or sector i of each cell. The transmit power $P_{k,i}$ for each frequency bin k in outer region i or sector i may be set as:

$$P_{k,i} = \frac{P_{max}}{K_i}. \quad \text{Eq (2)}$$

As shown in equations (1) and (2), the per-bin transmit power $P_k$ for the inner users during the $T_{in}$ time intervals is lower than the per-bin transmit power $P_k$ for the outer users during the $T_{out}$ time intervals. The lower per-bin transmit power $P_k$ results in less inter-cell interference among the inner users.

For both sectorized and unsectorized cells, the regions in which the users are located may be ascertained in various manners. In an embodiment, the region in which a given user u is located is determined based on an "active set" maintained by/for user u. The active set may contain all cells/sectors that are serving the user, all cells/sectors that are candidates for serving the user, cells/sectors that are strongly received by the user, cells/sectors that strongly receive the user, and so on. A cell/sector may be added to the active set, for example, if the received pilot power for the cell/sector, as measured by user u, exceeds an add threshold. Alternatively or additionally, a cell/sector may be added to the active set if the received pilot power for user u, as measured at the cell/sector, exceeds the add threshold. A cell/sector may also be added to the active set in other manners.

Table 1 lists some possible active sets for a given user in cell 1 in FIG. 3. Each active set contains one or two cells. For each active set, Table 1 gives the region in which the user is deemed to be located and the frequency subband(s) that may be used for the user. If the active set contains only cell 1, then the user is deemed to be located in inner region 0 since no other cells are strongly received by the user. If the active set contains cell 1 and another cell y, then the user is deemed to be located in the outer region that borders neighbor cell y since cell y is also strongly received by the user.

TABLE 1

| Active Set | Region | Frequency Subband(s) |
|---|---|---|
| (1) | 0 | $f_1, f_2, f_3$ |
| (1, 2) | 1 | $f_1$ |
| (1, 3) | 2 | $f_3$ |
| (1, 4) | 2 | $f_3$ |
| (1, 5) | 3 | $f_2$ |
| (1, 6) | 3 | $f_2$ |
| (1, 7) | 1 | $f_1$ |

In another embodiment, the region in which a given user is located is determined based on a position estimate for the user. The position of the user may be estimated using various position determination techniques such as, for example, Global Positioning System (GPS), Advanced Forward Link Trilateration (A-FLT), and so on. The region in which the user is located may be determined based on the position estimate and cell layout information.

Several embodiments for determining the region in which a given user is located have been described. The region in which the user is located may also be determined in other manners and/or based on other measurements besides received pilot power. For example, strong cells/sectors may be identified based on signal-to-noise ratios (SNRs), channel gains, and so on. In general, the region in which a user is located may be determined based on direct measurements and/or deduced based on related measurements, cell layout, and/or other information.

The K total frequency bins in the frequency band may be distributed to the non-overlapping frequency subbands in various manners. The frequency subbands are non-overlapping or orthogonal in that each frequency bin belongs in only one subband, if any.

Figure 7A:
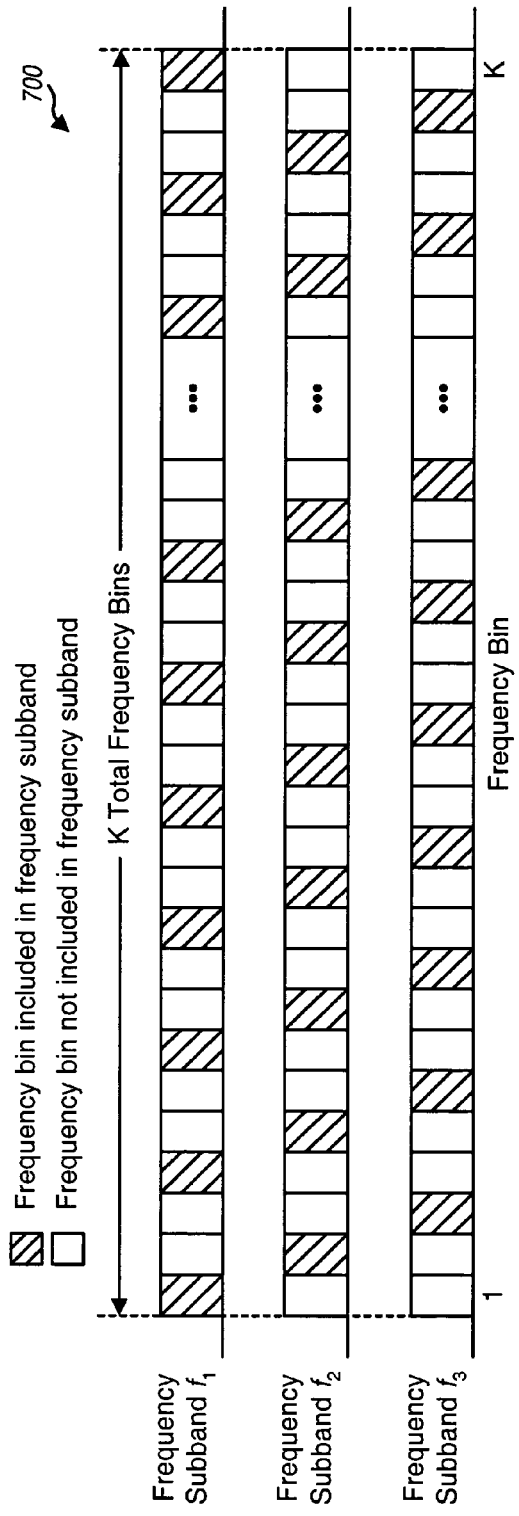
FIGS. 7A and 7B show two exemplary frequency subband structures.

FIG. 7A shows a frequency subband structure 700, which is an embodiment of partitioning the frequency band into three frequency subbands $f_1$, $f_2$ and $f_3$. In this embodiment, the K total frequency bins are distributed to the three frequency subbands such that each subband contains approximately K/3 bins that are uniformly distributed across the entire frequency band. Frequency subband $f_1$ may contain frequency bins 1, 4, 7, and so on, frequency subband $f_2$ may contain frequency bins 2, 5, 8, and so on, and frequency subband $f_3$ may contain frequency bins 3, 6, 9, and so on.

Figure 7B:
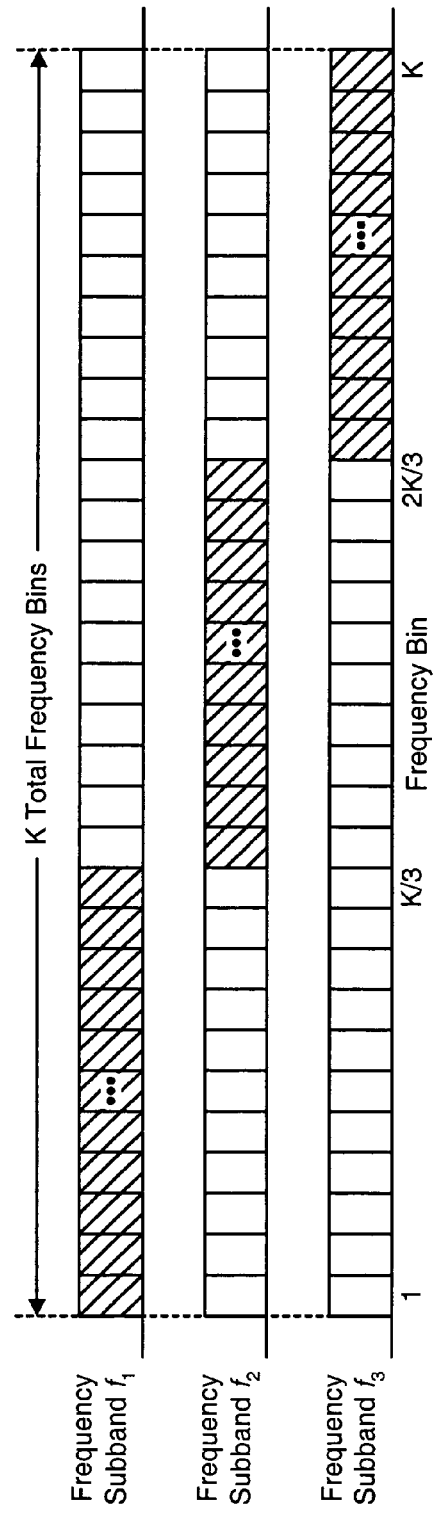

FIG. 7B shows a frequency subband structure 710, which is another embodiment of partitioning the frequency band into three frequency subbands $f_1$, $f_2$ and $f_3$. In this embodiment, the K total frequency bins are distributed to the three frequency subbands such that each subband contains approximately K/3 consecutive bins. Frequency subband $f_1$ may contain frequency bins 1 through K/3, frequency subband $f_2$ may contain frequency bins K/3+1 through 2K/3, and frequency subband $f_3$ may contain frequency bins 2K/3+1 through K.

In general, each frequency subband may contain any number of frequency bins and any one of the K total frequency bins. To obtain frequency diversity, each frequency subband may contain frequency bins taken from across the frequency band, e.g., as shown in FIG. 7A. To reduce pilot overhead for channel estimation, each frequency subband may contain a block of consecutive frequency bins, e.g., as shown in FIG. 7B.

The same or different frequency subband structures may be used for the downlink and uplink. For example, subband structure 700 may be used for the downlink, and subband structure 710 may be used for the uplink. The frequency subbands for each link may be static or may be configurable. Information indicating which frequency bins are included in each frequency subband may be known by the terminals a priori and/or may be broadcast by the base stations.

Figure 8:
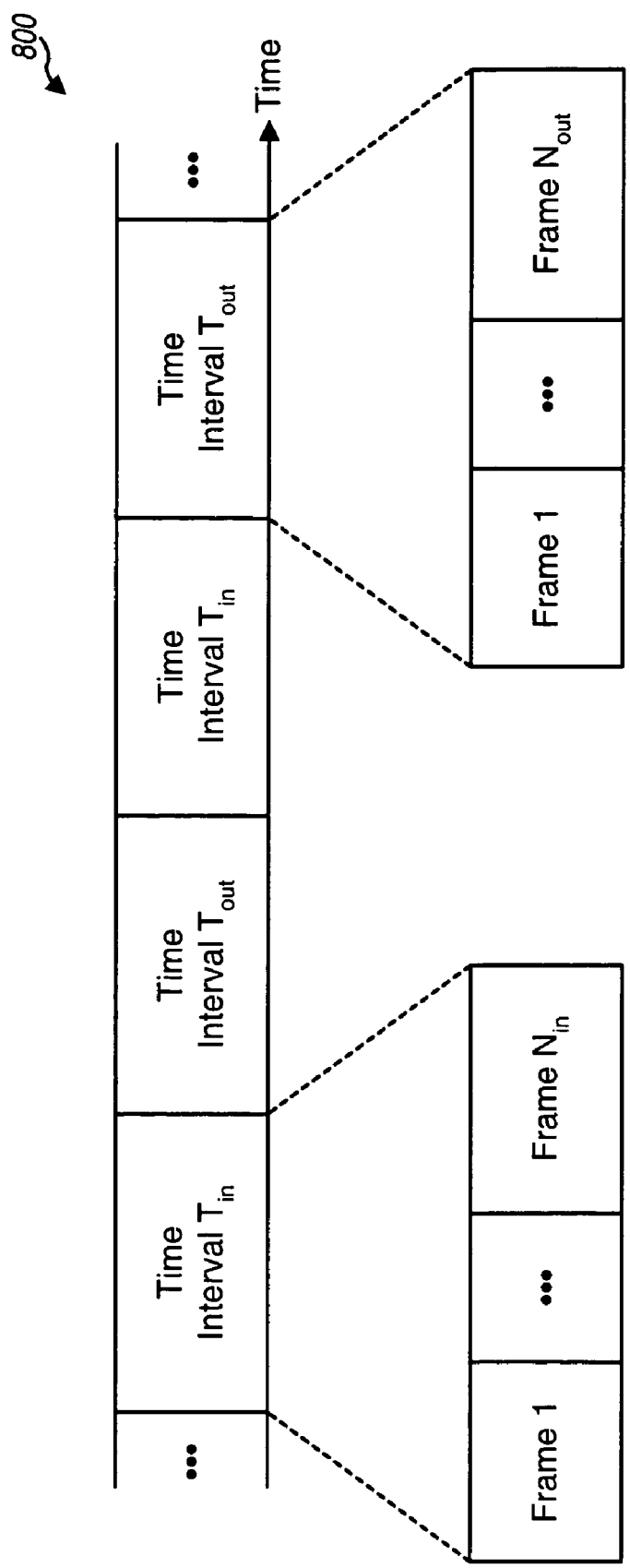
FIG. 8 shows an exemplary transmission timeline.

FIG. 8 shows an exemplary transmission timeline 800 that may be used for the transmission techniques described herein. In the embodiment shown in FIG. 8, the transmission timeline is partitioned into time intervals that are alternately designated as $T_{in}$ and $T_{out}$ interval spans. Each $T_{in}$ time interval spans $N_{in}$ frames, and each $T_{out}$ time interval spans $N_{out}$ frames, where in general $N_{in} > 1$ and $N_{out} > 1$. Each frame may span any time duration, e.g., 2, 5, 10, 20, 40 or 80 milliseconds (ms).

In general, the $T_{in}$ and $T_{out}$ time intervals may be the same or different durations. The $T_{in}$ and $T_{out}$ time intervals may have fixed durations, which may be selected based on expected data requirements for the inner and outer regions. Alternatively, the $T_{in}$ and $T_{out}$ time intervals may have configurable durations, which may be selected based on actual data requirements for the inner and outer regions.

The transmission techniques may also be used with a single frequency subband or a single carrier. For example, each $T_{out}$ time interval may be partitioned into smaller $T_1$, $T_2$ and $T_3$ time intervals. The users in outer region 1 for all cells may be scheduled for transmission on the single frequency subband in the $T_1$ time intervals, the users in outer region 2 may be scheduled in the $T_2$ time intervals, and the users in outer region 3 may be scheduled in the $T_3$ time intervals.

FIG. 9 shows an embodiment of a process 900 to exchange data in accordance with the transmission techniques described herein. Process 900 may be performed by a cell. The region in which each user is located is determined, e.g., based on the active set for the user, measurements made by the user for different cells or sectors, measurements made by different cells or sectors for the user, and so on (block 912). The cell may be partitioned into at least one inner region and multiple outer regions. For example, the cell may be partitioned into (1) one inner region and three outer regions that are served by a single base station, e.g., as shown in FIG. 2, or (2) three inner regions and three outer regions that are served by three BTSs, e.g., as shown in FIG. 5. The cell may also be partitioned into fewer or more regions. The partitioning of a cell into multiple regions may be achieved physically with different antenna beam patterns or virtually based on measurements and/or other information.

The users in the inner region(s) are scheduled for transmission in $T_{in}$ time intervals (block 914). The users in the outer regions are scheduled for transmission in $T_{out}$ time intervals (block 916). Data is exchanged with the scheduled users in the inner region(s) on the entire frequency band in the $T_{in}$ time intervals (block 918). Data is exchanged with the scheduled users in the multiple outer regions on different frequency subbands in the $T_{out}$ time intervals (block 920). For example, if there are three outer regions 1, 2 and 3, then the frequency band may be partitioned into three frequency subbands $f_1$, $f_2$ and $f_3$. Data may then be exchanged on all three frequency subbands with the scheduled users in the inner region(s). Data may be exchanged on frequency subbands $f_1$, $f_2$ and $f_3$ with the scheduled users in outer regions 1, 2 and 3, respectively. In each time interval, the total transmit power may be distributed across all frequency bins available for transmission in that time interval. A data exchange may comprise sending data to a user on the downlink, receiving data from the user on the uplink, or both.

FIG. 10 shows an embodiment of a process 1000 to exchange data in accordance with the transmission techniques described herein. Process 1000 may be performed by a sector in a sectorized cell. The region in which each user is located is determined (block 1012). The users in the inner region are scheduled for transmission in $T_{in}$ time intervals (block 1014). The users in the outer region are scheduled for transmission in $T_{out}$ time intervals (block 1016). Data is exchanged with the scheduled users in the inner region on the entire frequency band in the $T_{in}$ time intervals (block 1018). Data is exchanged with the scheduled users in the outer region on a designated frequency subband in the $T_{out}$ time intervals (block 1020). The designated frequency subband is a portion of the frequency band and is orthogonal to the frequency subbands for adjacent sectors in neighboring cells. Alternatively or additionally, data may be exchanged with the scheduled users in the outer region in a portion of each $T_{out}$ time interval.

Figures 11, 12:
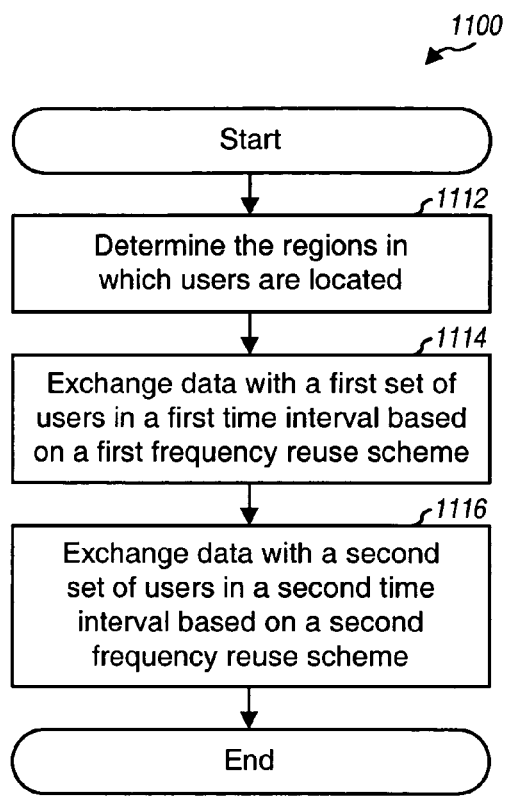
FIG. 11 shows a process to transmit data with multiple frequency reuse schemes.
FIG. 12 shows a process to exchange data by a terminal.

FIG. 11 shows an embodiment of a process 1100 to exchange data in accordance with the transmission techniques described herein. Process 1100 may be performed by a sector or a cell. The regions in which users are located are determined (block 1112). Data is exchanged with a first set of users in a first time interval based on a first frequency reuse scheme (block 1114). Data is exchanged with a second set of users in a second time interval based on a second frequency reuse scheme (block 1116). The first set of users may be users located in an inner region of the sector or in at least one inner region of the cell. The second set of users may be users located in an outer region of the sector or in multiple outer regions of the cell. The first frequency reuse scheme may be associated with a frequency-use factor of one and may allow the entire frequency band to be used for transmission. The second frequency reuse scheme may be associated with a frequency use factor of less than one and may allocate different frequency subbands or different parts of the second time interval to different outer regions or different sectors.

FIG. 12 shows an embodiment of a process 1200 to exchange data in accordance with the techniques described herein. Process 1200 may be performed by a terminal. The region in which the terminal is located is determined, e.g., based on measurements made by the terminal for different base stations and/or measurements made by the base stations for the terminal (block 1212). A determination is then made whether the terminal is located in an inner region or an outer region. Data is exchanged with at least one base station in a first time interval on a frequency band if the terminal is located in an inner region (block 1214). Data is exchanged with at least one base station in a second time interval on a frequency subband if the terminal is located in an outer region (block 1216). The frequency subband is a portion of the frequency band.

Figure 13:
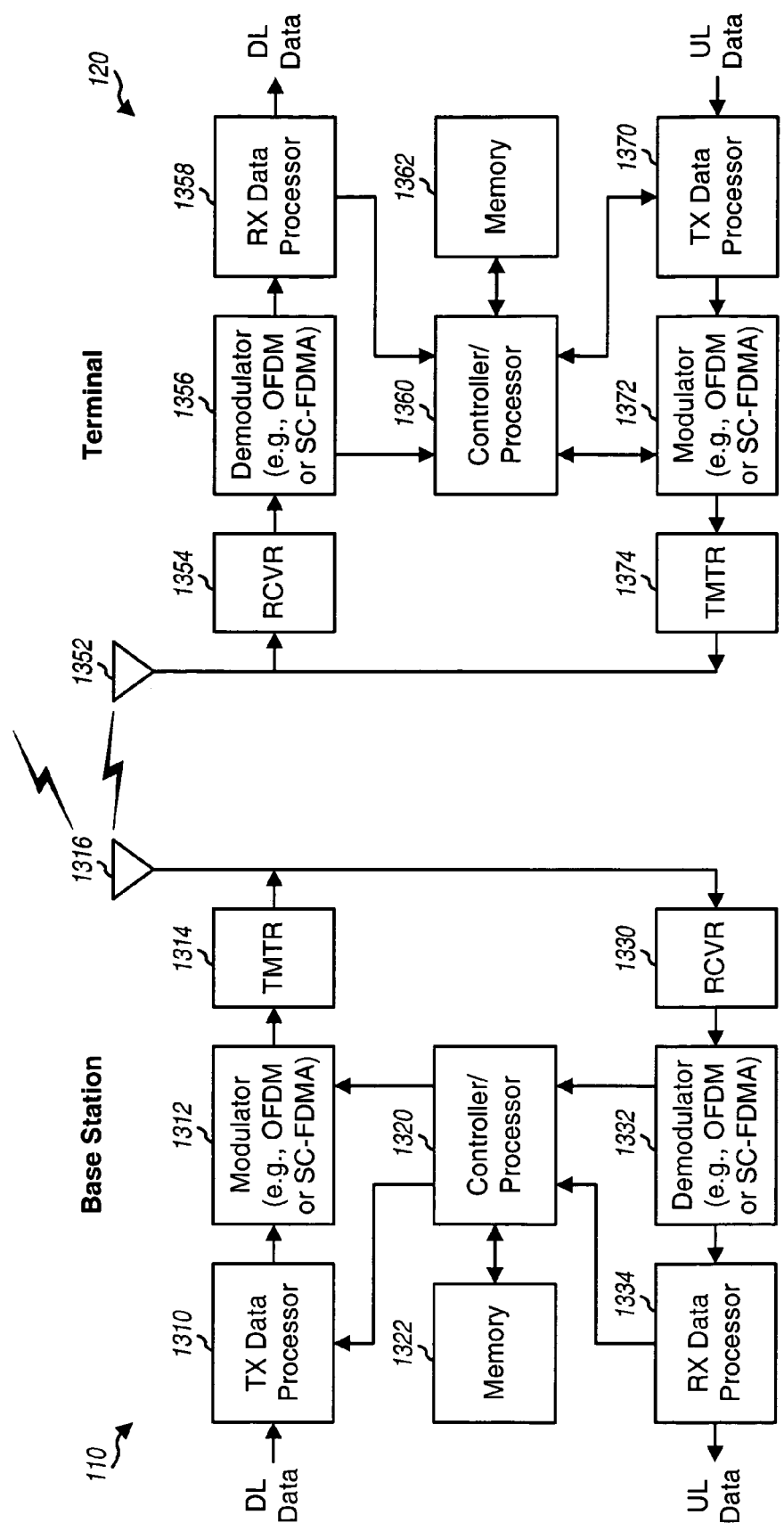
FIG. 13 shows a block diagram of a base station and a terminal.

FIG. 13 shows a block diagram of an embodiment of base station 110 and terminal 120. For the downlink, at base station 110, a transmit (TX) data processor 1310 receives traffic data for the scheduled terminals, processes (e.g., encodes, interleaves, and symbol maps) the traffic data, and provides data symbols. As used herein, a data symbol is a modulation symbol for data, a pilot symbol is a modulation symbol for pilot, a modulation symbol is a complex value for a point in a signal constellation (e.g., for M-PSK or M-QAM), and pilot is data that is known a priori by both the base station and the terminals.

A modulator 1312 performs modulation for OFDM, SC-FDMA, and/or other modulation techniques supported by the system. For OFDM, modulator 1312 may (1) map the data symbols to frequency bins assigned to the scheduled terminals, (2) map pilot symbols to frequency bins used for pilot transmission, (3) transform the data and pilot symbols to the time domain with an IFFT, and (4) append a cyclic prefix to each OFDM symbol. For SC-FDMA, modulator 1312 may (1) transform the data and pilot symbols to the frequency domain with an FFT, (2) map the FFT output to assigned frequency bins, (3) map zero values to unassigned frequency bins, (4) transform the mapped values to the time domain with an IFFT, and (5) append a cyclic prefix to each SC-FDMA symbol. Modulator 1312 provides a stream of transmissions symbols, which may be OFDM symbols or SC-FDMA symbols. A transmitter unit (TMTR) 1314 processes (e.g., converts to analog, filters, amplifies, and frequency upconverts) the transmission symbols and generates a downlink signal, which is transmitted via an antenna 1316.

At terminal 120, an antenna 1352 receives the downlink signal from base station 110 and provides a received signal to a receiver unit (RCVR) 1354. Receiver unit 1354 conditions (e.g., filters, amplifies, frequency downconverts, and digitizes) the received signal and provides data samples. A demodulator (Demod) 1356 performs demodulation in a manner complementary to the modulation performed by modulator 1312 at base station 110 and provides symbol estimates. A receive (RX) data processor 1358 processes (e.g., demaps, deinterleaves, and decodes) the symbol estimates and provides decoded data.

On the uplink, at terminal 120, traffic data is processed by a TX data processor 1370, further processed by a modulator 1372, and conditioned by a transmitter unit 1374 to generate an uplink signal, which is transmitted via antenna 1352. At base station 110, the uplink signal is received by antenna 1316, conditioned by a receiver unit 1330, processed by a demodulator 1332, and further processed by an RX data processor 1334.

Controllers/processors 1320 and 1360 direct the operation at base station 110 and terminal 120, respectively. Controllers/processors 1320 and 1360 may also perform various functions for the transmission techniques described herein. For example, controller/processor 1320 may perform or supervise process 900 in FIG. 9, process 1000 in FIG. 10, and/or process 1100 in FIG. 11. Controller/processor 1360 may perform or supervise process 1200 in FIG. 12. Memory units 1322 and 1362 store data and program codes for base station 110 and terminal 120, respectively.

For the transmission techniques described herein, a scheduler for a sector, a cell, multiple sectors, or multiple cells may determine the region in which each user is located, determine the frequency subband(s) that may be used for each user, schedule users for data transmission, and allocate frequency bins or assign traffic channels from the applicable frequency subband(s) to the scheduled users. Each sector or cell may provide each scheduled user with the assigned frequency bins or traffic channel, e.g., via over-the-air signaling. Each sector or cell may send data on the downlink to the terminal and/or receive data on the uplink from the terminal on the assigned frequency bins.

For clarity, the transmission techniques have been specifically described for OFDM and SC-FDMA, with each frequency subband including multiple frequency bins formed with OFDM or SC-FDMA. The transmission techniques may also be used for other communication systems. For example, the techniques may be used for a CDMA system with three carriers. A carrier may have a bandwidth of 1.23 MHz in cdma2000. The inner region(s) of each cell may be assigned all three carriers, and the three outer regions or sector of each cell may be assigned different carriers.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

The invention claimed is:

1. An apparatus comprising:
   at least one processor configured to exchange data with users in at least one inner region of a cell in a first time interval on a frequency band, and to exchange data with users in multiple outer regions of the cell in a second time interval on multiple frequency subbands formed with the frequency band, wherein each of the multiple outer regions is adjacent to the inner region; and
   a memory coupled to the at least one processor.

2. The apparatus of claim 1, wherein the at least one processor exchanges data with users in each outer region on a different frequency subband that is non-overlapping with at least one frequency subband used for at least one adjacent outer region in at least one neighboring cell.

3. The apparatus of claim 1, wherein the multiple outer regions comprise first, second and third outer regions, wherein the multiple frequency subbands comprise first, second and third frequency subbands, and wherein the at least one processor exchanges data with users in the first, second and third outer regions on the first, second and third frequency subbands, respectively, in the second time interval.

4. The apparatus of claim 1, wherein the at least one processor exchanges data with at least one user in the at least one inner region in the second time interval at reduced transmit power.

5. The apparatus of claim 1, wherein the at least one processor determines regions in which users are located based on pilot measurements.

6. The apparatus of claim 1, wherein the at least one processor determines an active set for a user and determines a region in which the user is located based on the active set.

7. The apparatus of claim 1, wherein the frequency band comprises a plurality of frequency bins, and wherein each of the multiple frequency subbands comprises a different subset of the plurality of frequency bins.

8. The apparatus of claim 1, wherein the at least one processor exchanges data with the users using orthogonal frequency division multiplexing (OFDM).

9. The apparatus of claim 1, wherein the at least one processor exchanges data with the users using single-carrier frequency division multiple access (SC-FDMA).

10. A method comprising:
exchanging data with users in at least one inner region of a cell in a first time interval on a frequency hand; and
exchanging data with users in multiple outer regions of the cell in a second time interval on multiple frequency subbands formed with the frequency band, wherein each of the multiple outer regions is adjacent to the inner region.

11. The method of claim 10, wherein the exchanging data with the users in the multiple outer regions comprises
exchanging data with users in first, second and third outer regions on first, second and third frequency subbands, respectively, in the second time interval.

12. The method of claim 10, further comprising:
processing the data for the users in the at least one inner region and the data for the users in the multiple outer regions with orthogonal frequency division multiplexing (OFDM).

13. The method of claim 10, further comprising:
determining regions in which users are located based on pilot measurements.

14. The method of claim 10, wherein exchanging data with users in multiple outer regions of the cell in a second time interval on multiple frequency subbands formed with the frequency band comprises exchanging data with the users in each outer region on a different frequency subband that is non-overlapping with at least one frequency subband used for at least one adjacent outer region in at least one neighboring cell.

15. The method of claim 10, further comprising exchanging data with at least one user in the at least one inner region in the second time interval at reduced transmit power.

16. The method of claim 10, further comprising:
determining an active set for a user; and
determining a region in which the user is located based on the active set.

17. The method of claim 10, wherein the frequency band comprises a plurality of frequency bins, and wherein each of the multiple frequency subbands comprises a different subset of the plurality of frequency bins.

18. The method of claim 10, further comprising processing the data for the users in the at least one inner region and the data for the users in the multiple outer regions with single-carrier frequency division multiple access (SC-FDMA).

19. An apparatus comprising:
means for exchanging data with users in at least one inner region of a cell in a first time interval on a frequency band; and
means for exchanging data with users in multiple outer regions of the cell in a second time interval on multiple frequency subbands formed with the frequency band, wherein each of the multiple outer regions is adjacent to the inner region.

20. The apparatus of claim 19, wherein the means for exchanging data with the users in the multiple outer regions comprises
means for exchanging data with users in first, second and third outer regions on first, second and third frequency subbands, respectively, in the second time interval.

21. The apparatus of claim 19, further comprising:
means for processing the data for the users in the at least one inner region and the data for the users in multiple outer regions with orthogonal frequency division multiplexing (OFDM).

22. The apparatus of claim 19, further comprising:
means for determining regions in which users are located based on pilot measurements.

23. An apparatus comprising:
at least one processor configured to exchange data with users in inner regions of multiple sectors in a first time interval on a frequency hand, and to exchange data with users in outer regions of the multiple sectors in a second time interval on multiple frequency subbands formed with the frequency band, wherein the inner region of each sector is adjacent to the inner region of at least one other sector; and
a memory coupled to the at least one processor.

24. The apparatus of claim 23, wherein the at least one processor distributes total transmit power across frequency bins in the frequency band for the first time interval, and distributes total transmit power across frequency bins in the frequency subband for the second time interval.

25. An apparatus comprising:
means for exchanging data with users in inner regions of multiple sectors in a first time interval on a frequency band; and
means for exchanging data with users in outer regions of the multiple sectors in a second time interval on multiple frequency subbands formed with the frequency band, wherein the inner region of each sector is adjacent to the inner region of at least one other sector.

26. The apparatus of claim 25, further comprising:
means for distributing total transmit power across frequency bins in the frequency band for the first time interval, and
means for distributing total transmit power across frequency bins in the frequency subband for the second time interval.

27. A computer readable storage medium encoded thereon with instructions that when executed cause an apparatus to perform a method, said method comprising:
exchanging data with users in at least one inner region of a cell in a first time interval on a frequency band; and
exchanging data with users in multiple outer regions of the cell in a second time interval on multiple frequency subbands formed with the frequency band, wherein each of the multiple outer regions is adjacent to the inner region.

28. A base station comprising:
at least one processor configured to exchange data with users in at least one inner region of a cell in a first time interval on a frequency band, and to exchange data with users in multiple outer regions of the cell in a second time interval on multiple frequency subbands formed with the frequency band, wherein each of the multiple outer regions is adjacent to the inner region;

a memory coupled to the at least one processor; and an antenna coupled to the at least one processor configured to transmit data to the users.

29. A method comprising:

exchanging data with users in inner regions of multiple sectors in a first time interval on a frequency band; and exchanging data with users in outer regions of the multiple sectors in a second time interval on frequency subbands formed with the frequency band, wherein the inner region of each sector is adjacent to the inner region of at least one other sector.

30. A computer readable storage medium encoded thereon with instructions that when executed cause an apparatus to perform a method, said method comprising:

exchanging data with users in inner regions of multiple sectors in a first time interval on a frequency band; and exchanging data with users in outer regions of the multiple sectors in a second time interval on frequency subbands formed with the frequency band, wherein the inner region of each sector is adjacent to the inner region of at least one other sector.

31. A base station comprising:

at least one processor configured to exchange data with users in inner regions of multiple sectors in a first time interval on a frequency band, and to exchange data with users in outer regions of the multiple sectors in a second time interval on multiple frequency subbands formed with the frequency band, wherein the inner region of each sector is adjacent to the inner region of at least one other sector;

a memory coupled to the at least one processor; and an antenna coupled to the at least one processor configured to transmit data to the users.

* * * * *